Feb. 20, 1940.  R. C. PIERCE  2,190,996
ENERGY ABSORBING DEVICE
Original Filed Jan. 26, 1937   2 Sheets-Sheet 1
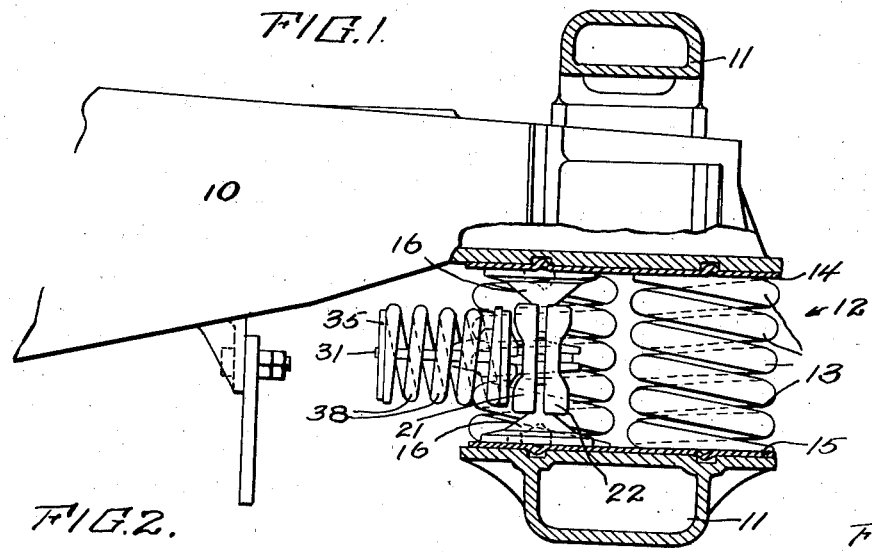
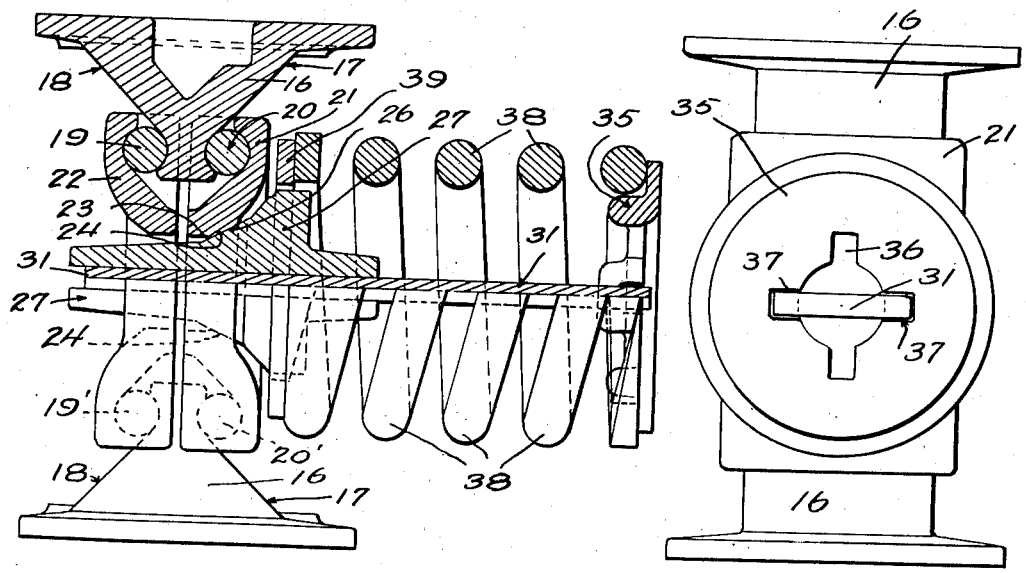
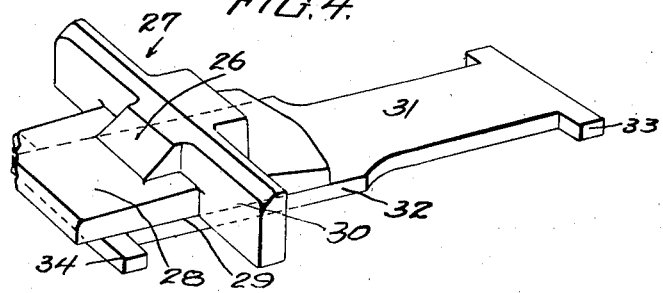
INVENTOR.
RAYMOND C. PIERCE.
BY
R. S. Trogner
his ATTORNEY Feb. 20, 1940.	R. C. PIERCE	2,190,996
ENERGY ABSORBING DEVICE
Original Filed Jan. 26, 1937    2 Sheets-Sheet 2
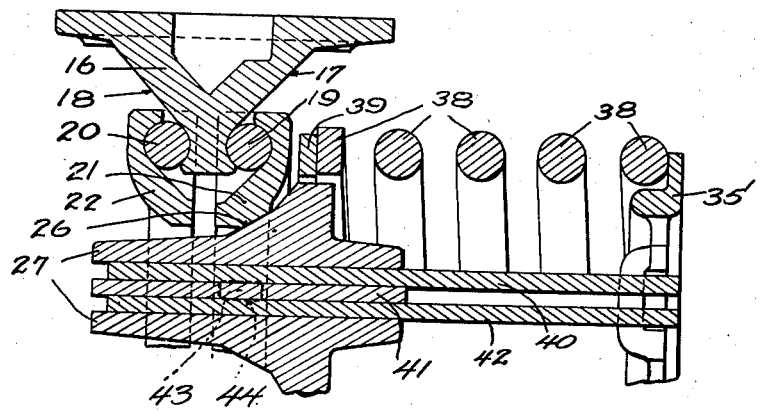
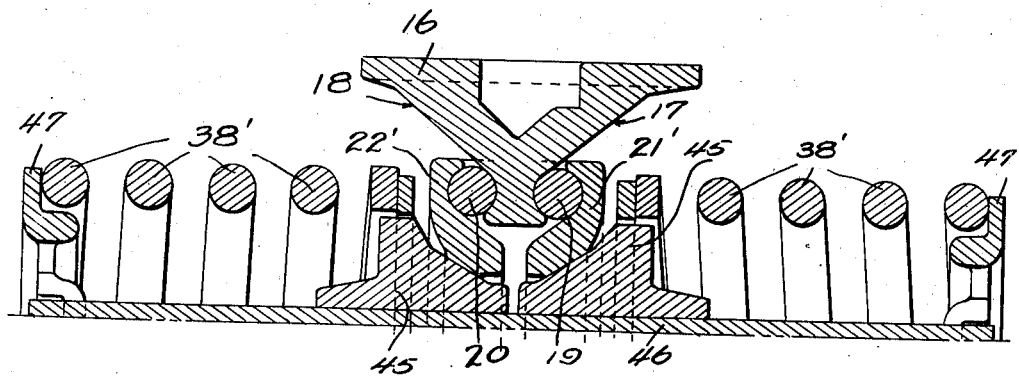
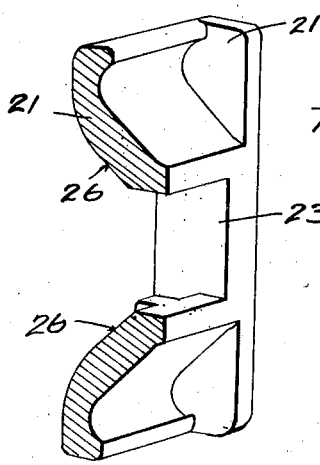
INVENTOR.
RAYMOND C. PIERCE.
BY R. S. Trogner
his ATTORNEYS.

Patented Feb. 20, 1940

2,190,996

UNITED STATES PATENT OFFICE 2,190,996

ENERGY ABSORBING DEVICE

Raymond C. Pierce, Chicago, Ill.

Application January 26, 1937, Serial No. 122,338
Renewed July 15, 1939

11 Claims. (Cl. 267—9)

My present invention relates to energy absorbing devices and, more particularly to devices for the control of or, to control the tendency of vehicle springs to unduly oscillate at certain critical vehicle speeds.

In the design of most vehicle springs it is customary to include some form of means to counteract the oscillating of the springs caused by uneven road or track conditions. Automobiles, generally, are provided with so-called snubbers. Railroad cars often are equipped with some form of friction device whereby the tendency on the part of the springs is minimized. One type used is that wherein combined elliptical-leaf and coil springs are used. Then again other devices are resorted to wherein special types of volute or coil springs are used which are capable of providing frictional energy absorption by relative motion between the spring members.

However, irrespective of the type of spring or the device used to control the action thereof, the ultimate desired result is based largely upon the operating conditions of the vehicle and the degree of shock absorption necessary to meet average working conditions. If, for example in the case of rail vehicles, friction springs are used and more than approximately twenty per centum of the total energy given the springs is absorbed stiff or hard riding of the pay load results and, likewise too little absorption will not control oscillation of the springs at certain critical vehicle speeds.

Having the foregoing facts and conditions in mind, I have evolved a simple, economical and practical design wherein the applied forces are transmitted or transformed into a direction substantially at right angles thereto and then absorbed to an extent sufficient to meet all desired operating conditions.

The many objects and advantages of such a control device will be readily apparent to those skilled in the art and more readily apparent after reading the following specification and the attached drawings, wherein:

Figure 1 is an elevational view, partly in section, of one end of a car bolster showing my device installed therein;

Figure 2 a longitudinal sectional view of my device;

Figure 3 an end view thereof;

Figure 4 a perspective view of the friction bar with one of the friction shoes positioned thereon;

Figure 5 a sectional perspective view of one of the roller seats;

Figure 6 a longitudinal sectional view of a modified form; and

Figure 7 a longitudinal sectional view of a second modified form thereof.

In the drawings, I have illustrated my invention as applied to the customary freight car design, and use such illustration merely because it perhaps more aptly, generally speaking, discloses the salient features of my invention than would certain other types of installation to which my invention may be applied.

Railroad car springs are generally of the group type and are placed between the end of the bolster, which supports the car, and the lower or tension member of the truck side frame, which in turn is supported by bearings riding on the axle journals. The bolster and column guides, which are a part of the side frames, are made of unmachined cast steel and must be loosely fitted to give the car truck sufficient flexibility for operation over rough road beds. As a consequence there is considerable horizontal motion between the ends of the springs in addition to the vertical motions imparted by the passage of the car truck over the road bed. Due to the short length of the springs as well as their relatively short diameters, there is little space into which friction devices may be built. The lack of parallel motion lengthwise of the springs also makes the problem of designing efficient small frictional devices all but impossible.

Experience has shown that frictional devices occupying the space of one spring removed from a group, are short lived, not only from lack of adequate frictional areas but also because the friction parts will not stay in surface contact due to non-parallel motion of the parts themselves.

To secure more room for friction parts and to enable me to secure a design in which the friction parts will remain in surface contact in spite of non-parallel motion of the springs, I have provided means for transforming the direction of forces from vertical to horizontal, thus securing any desired amount of space and I have produced the friction parts of such design as to remain always in surface contact.

In the form of my invention illustrated I overcome the weaknesses of other designs in a manner which I shall now describe.

In the drawings the numeral 10 designates one end of a typical freight car bolster, 11 the truck side, and 12 the spring assembly. The spring assembly comprises a plurality of coil springs 13 secured between plates 14—15 carried by the bolster and truck side respectively. In the application of my device one of the springs 13 is removed (preferably one of the inside springs) and my device inserted in place thereof. A pair of wedge blocks 16, having inclined faces 17—18, are located between the bolster spring plate 14 and the truck spring plate 15 and, generally speaking, follow the motions of said plates. Rollers 19, 19', 20 and 20' engage the inclined surfaces of said wedge blocks and in turn engage laterally movable roller seats 21 and 22. The roller seat 21 is provided with a central aperture 23, and inclined bearing surfaces 24, for engagement with inclined bearing surfaces 26 of a pair of friction shoes 27. The shoes 27 are best illustrated in Figure 4 and, consist of a flat body portion 28, which provides a large friction surface 29, and an upstanding portion 30 for engagement with a spring mechanism later to be described. It will be clearly seen that by reason of the angular contact between the roller seat 21 and the inclined surfaces 26 of the friction shoes 27, all wear on the friction surfaces of the shoes will automatically be taken up thereby, and that any desired pressure between friction surfaces may be secured depending upon the angle of the surfaces employed.

Between the friction blocks 27 is mounted a friction bar 31 which has an elongate body portion 32 reduced at one end and carries at each end a pair of lugs 33 and 34. The body portion 32 engages the friction surfaces 29 of the friction shoes 27. The lugs 33 are used to lock a spring retaining flange 35 in position and, as best shown in Figure 3, are, in assembling the unit, passed through a slot 36 in the retaining flange 35, which is next rotated a quarter of a turn, whereupon the lugs 33 are seated in recesses 37 when the assembly is completed. A coil spring 38 surrounds the friction bar 31 and engages the retaining flange 35 at one end and a washer 39 at the other. The washer 39 has an opening centrally thereof, corresponding to the cross-sectional shape of the friction shoes 27 and, when the washer is in position, engages the upstanding flange 30 of the friction shoes.

The opposite end of the friction bar 31, through the medium of the lugs 34, engages the outer surface of the member 22 and any outward movement of said member causes the friction bar to move in a similar manner.

The operation of my device as just described is as follows. Assuming the device to be correctly positioned in the truck assembly of a freight car in motion, the combined movement of the car body, the bolster and truck side frame will cause the springs 13 to be compressed more or less depending upon the forces to which the springs are subjected. Any movement of the plates 14—15 will cause the wedge blocks 16 to be likewise affected, which movement causes the inclined surfaces 17 and 18 to force the rollers 19, 19', 20 and 20' to move laterally and in turn to move the roller seats 21 and 22. The lateral movement of the roller seat 21 causes the friction shoes 27 to move against the action of the spring 38, and to frictionally engage the friction bar 31. The roller seat 22, in engagement with the opposite inclined surfaces of the wedge blocks 16, will also be moved laterally but in a direction opposite to that of roller seat 21, and because of the fact roller seat 22 is held in engagement with the friction bar 31 by the lugs 34, the bar 31 is caused to move in the same direction. This later movement opposes the movement of the friction shoes 27 which results in a greater energy absorption, as is desired.

As will be readily seen the forces to which the springs 13 are subjected are transferred into a direction substantially at right angles thereto, and thereafter, because of the frictional engagement of the several parts, absorbed to an extent desired.

In Figure 6, I have illustrated a modified form of my invention wherein I make the friction bar 31 in several parts so as to increase the total frictional area of the friction members. In the design shown, the bar is made in three parts 40, 41 and 42, the middle member 41 having recesses 43 in the edges thereof for engagement with lugs 44 projecting inward from the side bars of the roller seat 21. The lugs 44 hold the member 41 in alignment with the roller seat 21 and cause the same to move in unison therewith. As in the case of my preferred form the members 40 and 42 are secured at one end to a spring retaining flange 35' and at the other to the roller seat 22. The operation of this embodiment is the same as the preferred form.

In Figure 7, I have illustrated another form of my invention wherein the roller seats 21' and 22' are identical and each is arranged to engage similar friction shoes 45 which in turn engage a common friction bar 46 under the tension of springs 38'. The outer ends of the springs 38' engage retaining flanges 47 which are secured to the ends of the friction bar 46 as in the case of the flange 35. By this arrangement the total frictional area between the friction shoes and the friction bar is considerably increased, additional spring capacity obtained, and a more balanced device results.

In operation the present modification functions substantially as before except that the movement of the friction bar is reduced to a minimum which fact is offset by increased motion of the friction parts due to a lesser angle of the wedge blocks.

Throughout the specification and drawings I have described and illustrated my invention as constituting a device for controlling the movement of a spring, or a group of springs as a unit, but I wish it clearly understood that my invention may be used in place of the usual spring or spring units. For example, my device may be used in place of the usual elliptical springs in an automobile chassis in which case my device would be secured between the frame of the chassis or sprung portions thereof, and the axle or unsprung portions, and the movements therebetween controlled as in the case of springs.

While I have described a preferred form of my invention and also two modifications thereof, I do not wish to be limited to such disclosures alone, nor to the specific materials designated, unless such limitations are included in the attached claims wherein I claim:

1. In an energy absorbing device, the combination of roller means having a minimum energy absorption for transforming forces into a direction substantially at right angles to the direction of applied force, and friction means including a plurality of friction surfaces movable relatively to each other under the pressure of a spring and a wedging action.

2. In an energy absorbing device, the combination of low friction power transmitting means for transforming forces into a direction substantially at right angles to the direction of applied force, and friction means including a plurality of friction surfaces movable relatively to each other under the pressure of a spring and a wedging action.

3. In an energy absorbing device, the combination of low energy absorption means for transforming forces into a direction substantially at right angles to the direction of applied force, and friction means including a plurality of friction surfaces arranged substantially at right angles to the direction of applied force and movable relatively to each other.

4. In an energy absorbing device, the combination therewith of frictional absorbing means working substantially at right angles to the direction of applied force, said frictional absorbing means being actuated by the movement of a spring through the medium of interposed surfaces and rollers.

5. An energy absorbing device comprising inclined surfaces for transmitting applied forces, rollers held in engagement with said inclined surfaces, a pair of friction shoes in engagement with said rollers and movable in a plane at right angles to the axis of said inclined surfaces, and friction members in frictional contact with said friction shoes, said friction shoes and said friction members being so arranged as to permit of relative movement therebetween under the action of a spring interposed between said friction shoes and said friction members.

6. An energy absorbing device comprising a pair of inclined surfaces, a pair of friction shoes arranged for relative movement in a plane substantially at right angles to the axis of said inclined surfaces and having low energy absorbing contact with said inclined surfaces, and friction members arranged between said friction shoes, said friction shoes and said friction members being so arranged as to permit of relative movement therebetween under the action of a spring interposed between said friction shoes and one of said friction members.

7. An energy absorbing device comprising a pair of wedge blocks having inclined surfaces, rollers in engagement with said inclined surfaces, a friction bar arranged centrally of said wedge blocks and having its major axis at right angles to the direction of applied force, a pair of friction shoes in engagement with said friction bar, means interposed between said friction shoes and said rollers on one side of said wedge blocks for transmitting movement therefrom, means interposed between the rollers on the opposite side of said wedge blocks and one end of said friction bar, and a coil spring interposed between said friction shoes and one end of said friction bar for resisting the movement of said friction shoes imparted thereto by said wedge blocks.

8. An energy absorbing device comprising, a pair of wedge blocks interposed between a sprung mass and an unsprung mass, rollers in contact with said wedge blocks, a friction bar interposed between said wedge blocks and having its major axis substantially at right angles to the direction of the major forces to which the device is subjected, friction shoes in frictional contact with said friction bar, and means interposed between said friction shoes and said rollers for transmitting forces from said wedge blocks to said friction blocks.

9. An energy absorbing device comprising, a pair of wedge blocks interposed between a sprung mass and an unsprung mass, rollers in contact with said wedge blocks, a friction bar interposed between said wedge blocks and having its major axis at right angles to the direction of the major forces to which the device is subjected, friction shoes in frictional contact with said bar, resilient means interposed between said friction shoes and one end of said friction bar, and means interposed between said friction shoes and said rollers for transmitting forces from said wedge blocks to said friction blocks.

10. In an energy absorbing device, the combination of low friction absorbing means for transmitting energy with minimum loss into a direction substantially at right angles thereto, and energy absorbing means acting along lines substantially at right angles to the applied forces, consisting of wedging means in co-operation with a spring, the action of said wedging means not being influenced by said energy transmitting means.

11. In an energy absorbing device, the combination therewith of frictional energy absorbing means operating substantially at right angles to the direction of applied forces, said frictional energy absorbing means consisting of wedging means in co-operation with a spring and actuated by the movement of said spring through the medium of low friction absorbing energy transmitting means.

RAYMOND C. PIERCE.